UNITED STATES PATENT OFFICE.

PHILIP M. McKENNA, OF WASHINGTON, DISTRICT OF COLUMBIA, ASSIGNOR TO CHEMICAL PRODUCTS COMPANY, OF WASHINGTON, DISTRICT OF COLUMBIA, A CORPORATION OF WEST VIRGINIA.

PROCESS FOR SEPARATING COBALT FROM ORES OR BY-PRODUCTS.

1,166,067. Specification of Letters Patent. Patented Dec. 28, 1915.

No Drawing. Application filed September 25, 1914. Serial No. 863,559.

*To all whom it may concern:*

Be it known that I, PHILIP M. McKENNA, a citizen of the United States, residing at Washington, in the District of Columbia, have invented certain new and useful Improvements in Processes of Separating Cobalt from Ores or By-Products; and I do hereby declare the following to be a full, clear, and exact description of the same.

The present invention has for its object the economical separation of cobalt metal in a substantially pure condition from ores or by-products containing the same, the invention being particularly adapted for the treatment of ores or by-products containing a large percentage of arsenic in proportion to the cobalt. Ores or by-products containing a small percentage of arsenic may be mixed with ores or by-products containing an excess, or arsenic may be added to increase the arsenic content to best adapt the same for treatment by the present process and hence it is not desired to limit the invention to the treatment of any particular raw material containing cobalt.

The raw material, ore or by-product containing cobalt is first treated to produce a speiss containing the cobalt and nickel, etc. This step of the process is conveniently performed in a furnace at a temperature of approximately 1200° C., preferably regulated to have a slightly reducing atmosphere, under which conditions a speiss is formed which when the fused mass is poured into a mold, collects at the bottom because of its greater specific gravity. A typical speiss may contain: 22.4% Co, 13.9% Ni, 10.6% Fe, 45.0% As, 3.6% Sb. The speiss is next treated to reduce the percentage of arsenic and this is preferably accomplished by comminuting the same as by grinding and then roasting in a furnace, the atmosphere of which is preferably alternately oxidizing and reducing. Favorable results are secured by grinding the speiss to pass a 60 mesh screen and during the initial roasting it should be heated to only a low red heat to prevent agglomeration, although the heat may be subsequently raised to a bright red. The action is accelerated by stirring during the roasting operation. The reduction in the percentage of arsenic may be within rather wide limits, thus, the percentage remaining may be from 8 to 23%. In this condition the speiss is ready for the succeeding operation which is based on the discovery that when the speiss is fused with boron trioxid the cobalt combines with the boron in a much greater percentage than does the nickel, with the result that a gravity separation of the nickel arsenid speiss and boric cobalt slag may be effected. The fusion is preferably effected in a furnace of the "Schwarz" type run with a neutral flame, although any furnace capable of a heat of 1200° C. and whose hearth is lined with silica will answer. The melt is made at a temperature which will keep the fusion liquid, usually 1000° C., and the quantity of $B_2O_3$ added is preferably by weight approximately equal to the weight of cobalt contained in the speiss. If commercial boric acid be used the quantity employed should be figured on the $B_2O_3$ content. As an example, if a speiss containing 24% cobalt and 16% nickel be fused with a weight of $B_2O_3$ equal to the weight of the cobalt in the speiss, approximately 87% of the cobalt will be extracted into or combined with the boric acid with enough nickel to make the proportions 6.2 cobalt to 1 nickel, and the nickel-arsenid will contain nickel and cobalt in ratio of 4.2 to 1. The iron in the speiss will be with the cobalt portion. The nickel arsenid speiss is separated from the boric cobalt slag by pouring the melt into a mold and while still hot, decanting the slag back into the hot furnace leaving a nickel arsenid button in the mold. The atmosphere in the furnace is now made of a more reducing character. In a "Schwarz" furnace this is accomplished by increasing the oil supply and cutting off the air supply. After about one-half hour, the melt is poured into a mold and allowed to cool. At the bottom of the mold will be found a small button containing nearly all of the small percentage of nickel in the slag, an equal quantity of cobalt and most of the arsenic and antimony. The button is removed and may be reground, re-roasted and treated with the next lot of roasted speiss. After the removal of the button the boric mass is charged into another furnace which may be similar to that used in making the speiss, but which is kept free from arsenic or antimony ores. Here it is heated as hot as possible with an oxidizing flame to expel any remaining arsenic or antimony. After about three hours it is poured and may be allowed to cool before the next operation which consists in charging the mass into an electric furnace where the cobalt, with some iron is reduced out as metal by heating with carbon and forms the finished product.

If iron be undesirable the speiss used should be freed from iron by melting with silica before roasting.

The boric acid may be used over again until it becomes too much diluted with silica, etc., from the furnace lining.

Obviously the process may start with a speiss of the character described regardless of the manner of producing the same and the separation of the cobalt from the boric cobalt slag may be effected otherwise than as herein specifically set forth, although the process described is preferred because of its efficiency and economy.

Having thus described my invention, what I claim as new and desire to secure by Letters Patent is,—

1. The process of separating cobalt from a speiss containing the same, which consists in effecting fractionation by fusing the speiss with boron-trioxid.

2. The process of separating cobalt from a speiss containing cobalt and nickel, which consists in fusing the speiss and boron-trioxid and causing the nickel arsenid speiss to separate from the boric cobalt slag by reason of the difference in their specific gravity.

3. The process of separating cobalt from a speiss containing the same, which consists in fusing the speiss and boron-trioxid, separating the arsenid speiss and boric cobalt slag and heating the latter to a high temperature under oxidizing conditions.

4. The process of separating cobalt from a speiss containing the same, which consists in fusing the speiss and a quantity of boron-trioxid substantially equaling in weight the cobalt in the speiss and in effecting a gravity-separation of the speiss and boric cobalt slag.

5. The process of separating cobalt from a speiss containing the same, which consists in fusing the speiss and boron-trioxid, separating the arsenid speiss and boric cobalt slag and in heating the latter to approximately 1000° C. under oxidizing conditions to expel arsenic and antimony from the cobalt oxid in the slag.

6. The process of separating cobalt from a speiss containing the same, which consists in producing therefrom a boric cobalt slag in which the cobalt exists as a cobalt oxid and in reducing the cobalt oxid to a metallic condition.

7. The process of separating cobalt from a speiss containing the same, which consists in producing therefrom a boric cobalt slag in which the cobalt exists as an oxid and in reducing the cobalt oxid to a metallic condition in an electric furnace in the presence of a reducing agent.

PHILIP M. McKENNA.

Witnesses:
A. G. McKenna,
J. R. Cain.